United States Patent [19]
Arnold et al.

[11] Patent Number: 5,786,428
[45] Date of Patent: Jul. 28, 1998

[54] ADSORBENTS FOR AMINO ACID AND PEPTIDE SEPARATION

[75] Inventors: Frances H. Arnold; Vidyasankar Sundaresan, both of Pasadena, Calif.

[73] Assignee: California Institute of Technology, Pasadena, Calif.

[21] Appl. No.: 622,747

[22] Filed: Mar. 27, 1996

[51] Int. Cl.$^6$ .................... C08F 12/08; C08F 112/08; C08F 212/08; C08F 20/10

[52] U.S. Cl. .................... 525/333.3; 525/330.3; 525/54.11

[58] Field of Search .................... 525/333.3, 330.3, 525/54.11

[56] References Cited

U.S. PATENT DOCUMENTS

| | | | |
|---|---|---|---|
| 5,310,648 | 5/1994 | Arnold et al. | 435/5 |
| 5,541,342 | 7/1996 | Korhonen et al. | 548/532 |

OTHER PUBLICATIONS

Rogozhin et al. "Ligand Chromatography On Assymetric Complex–forming Sorbents As A New Method For Resolution Of Racemates," *Chemical Communications*, p. 490 (1971).

Lefebvre et al., "Use Of New Chiral Hydrophilic Gels For The Direct Resolution α-Aminoacids By High Pressure Liquid Chromatography," *J. Liquid Chromatography*, 1(6), 761–774 (1978).

Galaverna et al. "Chiral Separation Of Unmodified Amino Acids By Ligand–Exchange High–Performance Liquid Chromatography Using Copper (II) complexes of $_L$–Amino Acid Amides As Additives To The Eluent," *J. Chromatography A.*, 657 (1993) 43–54.

Sellergren et al., "Highly Enantioselective And Substrate-–Selective Polymers Obtained By Molecular Imprinting Utilizing Noncovalent Interactions. NMR and Chromatographic Studies On The Nature Of Recognition," *J. Am. Chem. Soc.* 1988, 110, 5853–5860.

Andersson et al., "Imprinting Of Amino Acid Derivatives In Macroporous Polymers," *Tetrahedron Letters*, vol. 25, No. 45, pp. 5211–5214, 1984.

Kempe et al., "Binding Studies On Substrate–And Enantio–Selective Molecularly Imprinted Polymers," *Analytical Letters*, 24(7), 1137–1145 (1991).

Dhal, "Surface Grafting Of Functional Polymers To Macroporous Poly(trimethylolpropane trimethoacrylate)," *Chem. Mater.* 1995, 7, 154–162.

Dhal et al., "Metal–Coordination Interactions In The Template–Mediated Synthesis Of Substrate–Selective Polymers: Recognition Of Bis(imidazole) Substrates By Copper (II) Iminodiacetate Containing Polymers," *Macromolecules* 1992, 25, 7051–7059.

Sellergren et al., "Influence Of Polymer Morphology On The Ability Of Imprinted Network Polymers To Resolve Enantiomers," *J. Chromatography*, 635 (1993) 31–49.

Plunkett et al., "Molecularly Imprinted Polymers On Silica: Selective Supports For High Performance Ligand–Exchange Chromatographyyy," *J. Chromatography A.*, 708 (1995) 19–29.

*Primary Examiner*—Nathan M. Nutter
*Attorney, Agent, or Firm*—Openheimer Wolff & Donnelly LLP

[57] ABSTRACT

An adsorbent which selectively binds to one enantiomer of an optically active amino acid or peptide. The adsorbent includes a polymer matrix which contains one or more metal complexes that are oriented within the polymer matrix by molecular imprinting to provide selective binding of the matrix to only one enantiomer of the optically active amino acid or peptide. Separation systems are disclosed which use the adsorbent as the basis for conducting enantioresolution of optically active amino acids and peptides. Methods for using the adsorbent are also disclosed.

23 Claims, 6 Drawing Sheets

1      d-Phe      2

ADSORBENTS FOR AMINO ACID AND PEPTIDE SEPARATION

The United States Government has certain rights in this invention pursuant to Grant No. BES 9416915 awarded by the National Science Foundation.

BACKGROUND OF THE INVENTION

1. Field of the Invention

Separations often require an adsorbent that can distinguish a compound from contaminants that are chemically very similar. The present invention relates generally to materials used as selective adsorbents in ligand-exchange chromatography. More particularly, the present invention is directed towards tailoring the chiral selectivity characteristics of ligand-exchange adsorbents, by relying on the technique of molecular imprinting.

2. Description of Related Art

The publications and other reference materials referred to herein to describe the background of the invention and to provide additional detail regarding its practice are hereby incorporated by reference. For convenience, the reference materials are numerically referenced and grouped in the appended bibliography.

Ligand-exchange adsorbents exploit the rapid and reversible formation of metal ion complexes for binding and separating compounds that can donate electrons and coordinate to the metal ions immobilized by chelation to the adsorbent material.[1] Solvent components occupying coordination sites on the metal centers are displaced by ligands from the sample solution. Retention of a given species on an adsorbent in ligand exchange chromatography (LEC) is directly related to the stability of the mixed-ligand complex it forms with the metal ion complex in the adsorbent.

One particularly well-studied application of LEC is the separation of amino acids and their derivatives.[1,2,3] These molecules are biologically important as they are the components of proteins and peptides, and their determination may help give us answers to what proteins we have, what their nutritional or metabolic value is and what metabolic pathways they are involved in. In addition, amino acids have been used as markers in various diseases. For example, the hereditary disease phenylketonuria is caused by the absence of the active enzyme phenylalanine hydroxylase, which converts phenylalanine to tyrosine in the human body. This disease is characterized by mental retardation, seizures, rashes and high levels of phenylalanine in the blood. A preventive measure is to screen blood at birth, so that appropriate diets can be designed. Such applications call for the use of materials that are highly selective for the particular amino acid in question. Enantiomeric purity is also important from a pharmacological perspective. Peptides and amino acids administered as drugs should be enantiomerically pure, as different enantiomers can have different pharmaceutical activities. This again requires separation materials that are selective for the amino acid enantiomer in question. Often one wishes, for example, to remove a small amount of a contaminating enantiomer from a sample containing primarily the compound of interest. Then an adsorbent that selectively binds the contaminating enantiomer would be desired.

Chiral stationary phases (CSP) for LEC of amino acids are typically synthesized by covalent attachment of a chiral metal-chelating ligand such as l-proline to a chromatographic support such as silica beads. Alternatively, a polymerizable derivative of l-proline is used as a comonomer in a crosslinking polymerization procedure to obtain the adsorbent matrix. The mixed ligand complex that forms at the adsorbent surface has two chiral ligands coordinated (or chelated) to the metal ion, the l-proline from the CSP itself and the target chiral ligand from the sample. Another technique often used to resolve enantiomers of amino acids is to use chiral additives to the eluent, instead of using CSP's.[4] This technique however has a disadvantage in that the chiral additive must be separated later from the amino acid enantiomer of interest.

The preferential retention of one enantiomer on the adsorbent is not always predictable. A polystyrene-divinylbenzene material derivatized with l-proline,[1] for example, shows a different order of elution as compared to a polyacrylamide-based material,[2] for the same amino acid enantiomers. Thus the adsorbent to be used for a particular separation is often a matter of trial and error, as is the detailed protocol (solvent, additives, etc.). Sometimes appropriate chiral adsorbents cannot be found for a given separation. A generalizable approach to making chiral adsorbents specific for specific target molecules or for classes of target molecules would be highly beneficial.

Molecular imprinting has been used in the prior art to prepare selective adsorbents for chiral separations, including derivatized amino acids.[5-8] For example, the amino acid l-phenylalanine is derivatized to l-phenylalanine anilide or tert-butyloxycarbonyl-l-phenylalanine. The amino acid derivative is then used to preorganize methacrylic acid monomers in solution, which is followed by crosslinking polymerization. The mechanism of binding and recognition in these materials is believed to be hydrogen bond formation between the amino and/or carbonyl groups of the template molecule with the methacrylic acid and cavity-fitting in imprinted (chiral) cavities formed within the polymer. Derivatization of the amino acid helps to eliminate unfavorable repulsive electrostatic interactions between the methacrylic acid monomer and underivatized amino acid and assists in chiral recognition by adding a bulky side group to the template molecule. It also increases the solubility of the template in the organic solvents required to promote the hydrogen bonding interaction critical to the separation. The resulting material can subsequently be used for enantioresolution of the amino acid derivative, but not the free amino acid. Derivatization is cumbersome, and the procedure also requires additional steps to retrieve the free amino acid in order to be used on a preparative scale.

There is presently a need for new and improved procedures which are simple and effective enough to be used routinely to provide relatively rapid and highly selective amino acid purification and analysis. These new methods and systems should employ materials and techniques which are capable of separating and identifying closely related amino acids including amino acid enantiomers. The methods should have none of the drawbacks associated with the prior procedures based on derivatization and more traditional ligand exchange adsorbents.

SUMMARY OF THE INVENTION

In accordance with the present invention, molecularly imprinted materials are presented which are well-suited for purification and enantiomeric resolution of amino acids and peptides. The invention is based on the discovery that optically active amino acids and peptides are capable of selectively chelating with metal ions that are located in complexes with other ligands inside of imprinted cavities. The other ligand in these ternary complexes are designed to be polymerizable (called functional monomer), in order to covalently anchor the metal complexes in a specific imprinted orientation within a polymeric matrix. Thus, polymerization using multifunctional monomers creates cavities that are selective for the enantiomer used in the formation of the ternary metal complex. The resulting polymer matrix provides rebinding in an equilibrium or a chromatographic mode which is selective for the template enantiomer.

As one feature of this invention, a variety of polymerizable ligands are presented, that can be used to form ternary metal ion complexes with the template enantiomer of the amino acid of interest. The polymerizable ligands may themselves be chiral or achiral. Molecular imprinting during the material synthesis procedure is useful because, even with achiral polymerizable ligands such as the iminodiacetic acid derivatives presented in this invention, the polymers imprinted with chiral templates exhibit chiral selectivity. The enantioselectivity can be increased by the use of chiral polymerizable ligands in the ternary metal ion complexes. Examples of these chiral polymerizable ligands include polymerizable derivatives of l-proline, l-histidine and l-phenylalanine. The d- forms of these monomers may also be used to obtain materials exhibiting a broad spectrum of selectivity characteristics.

The polymer material can be synthesized using a bulk polymerization procedure in the presence of cross-linking agents, using thermal or photo-initiation. The bulk matrix is then ground and sieved, and the appropriate size fraction collected for use in the particular application. The material can also be synthesized as beads using dispersion polymerization techniques, or used in other macro structures such as plates, rods and membranes.

As another feature of the present invention, the imprinted polymer matrix is also presented as a surface coating on support particles or other surfaces for use in separation procedures. Monodisperse, spherical silica particles are well-suited for use as the support. The silica particles are derivatized using appropriate silanizing agents, to introduce preactive functionalities (e.g. double bonds) so that the polymer coat is covalently attached to the silica surface. This results in robust materials that can withstand mechanical stress under flow conditions in chromatography.

As a further feature of the present invention, the imprinted polymer is also presented as a surface-grafted coat on cross-linked polymer particles. These particles are synthesized using a variety of multifunctional monomers. Some exemplary monomers include styrene, divinylbenzene, trimethylolpropane trimethacrylate (TRIM), ethylene glycol dimethacrylate, ethylene glycol diacrylate, pentaerythritol dimethacrylate, pentaerythritol diacrylate, N,N'-methylenebisacrylamide, N,N'-ethylenebisacrylamide and N,N'-(1,2-dihydroxyethylene)bisacrylamide. Depending upon the choice of the monomers used, the polymer particles will have a variety of physical and mechanical properties, such as hydrophobicity/hydrophilicity, mechanical strength and ease or resistance to swelling in the presence of solvents. Polymerization conditions are controlled so as to leave unreacted double bonds in the matrix, which can then be used to covalently anchor the imprinted polymer graft on the particles. This system differs from the materials based on silica described above, in that this material is completely polymeric in nature, and does not require steps like silanization and derivatization required in the silica based materials. Both polymeric and silica-based materials are suitable for use as chromatographic adsorbents. Other materials suitable for preparing chromatographic adsorbents are well known to those versed in the art.

As another feature of the present invention, the imprinted materials can be tailored to suit a particular application by appropriate choice of metal ions. The metal ion used in the separation need not be the same as the metal ion used in the imprinted polymer synthesis scheme. The ligands incorporated into the polymer can bind to a variety of transition metal ions, with varying binding strengths. Similarly, the binding strengths and kinetics of substrate binding also vary according to the metal ion used and the ligand involved in the ternary complex. Thus, Cu(II) can be replaced with metals such as Ni(II), Zn(II), Co(II) or Fe(III) to target a wide variety of substrates for molecular imprinting. Suitable choice of metal ion can also be made in the application of these materials for separation, to tune the binding strengths of the interaction, in order to achieve efficient chromatographic separations.

The materials in accordance with the present invention may be used in ligand-exchange separations. Thus, the imprinted materials can be packed into a chromatographic column for achieving chiral separations of natural and nonnatural amino acids and peptides. Direct enantiomeric resolution of underivatized molecules is possible using these imprinted materials, thus eliminating the need to resort to derivatization and the further steps of de-derivatization and purification.

The present invention involves a unique approach to molecular imprinting that utilizes the advantages of metal ion coordination/chelation (ligand exchange) as the binding interaction for both the preparation of the adsorbent and the rebinding of the target molecule. It differs from previous ligand exchange adsorbents in that a molecular imprinting approach is used to prepare highly selective binding cavities in the polymeric materials. Thus the new materials offer useful features with respect to enantiomeric separations which are not found either in traditional LEC supports or in imprinted materials based on hydrogen bonding, electrostatic or covalent interactions.

The above described features and advantages of the present invention will become better understood by reference to the following detailed description when taken in conjunction with the accompanying drawings.

DETAILED DESCRIPTION OF THE INVENTION

This invention involves the preparation of selective ligand-exchange supports using molecular imprinting. In molecular imprinting (also known as template polymerization), the target molecule serves as a template to assemble its own recognition sites in a polymer; the resulting materials can selectively bind the templates with which they were prepared. First one forms an assembly between the polymerizable metal complex and the target molecule (or an appropriate analog), the polymerizable template:monomer assembly. Polymerization is carried out in the presence of crosslinking comonomers in order to fix a specific three dimensional arrangement of recognition sites in the polymer and cavities that will fit the template molecule. This technique has been used to create specific binding cavities with metal ions in spatial distributions complementary to bis-imidazole templates, as described in U.S. Pat. No. 5,310,648 and References 9 and 10.

In accordance with the present invention, we describe here the preparation of molecularly-imprinted ligand-exchange adsorbents and their use for enantio-resolution of amino acids, amino sugars and peptides. The adsorbents are useful in separating optical isomers of both natural and non-natural optically active amino acids as well as optically active peptides. Exemplary amino acids which may be enantioresolved include α-amino acids like phenylalanine, tyrosine, leucine, isoleucine, valine, β- amino acids like β-phenylalanine, β-tyrosine, β-leucine, β-isoleucine, β-valine, and other amino acid isomers like m-tyrosine. A wide variety of non-natural amino acids can also be targeted, such as fluorinated, chlorinated or brominated amino acids and N-1-methyl-7-azatryptophan, 7-azatryptophan, phenylazophenylalanine, biphenylalanine, 2-anthrylalanine, 1-naphthylalanine, 2-naphthylalanine, pyrenylalanine. Peptides may also be effectively purified using imprinted materials, providing they have residues that an bind metal ions. Exemplary peptides include tetanus and butolinum toxins, yeast transcription factors AMT1 and ACE1, gly-gly-histamine, gly-gly-his, cyclosporin A, and zinc finger peptides. Generally, peptide sequences which have chelating side chains or glutamates, aspartates, histidines and lysines in positions that can chelate metal ions e.g. a His-X₃-His segment in an α-helix peptide sequence can also be targeted. The particular enantiomers which are to be separated are referred to herein as the "target compounds." In the case of amino acids, the types of compounds which may be enantioresolved include both mixtures of enantiomers of the same amino acid, and mixtures of two or more different amino acids present as their respective enantiomers.

The adsorbents upon which the enantioresolution of the present invention are based include, as an essential component, a polymer matrix which contains one or more metal complexes which are oriented within the polymer matrix to provide selective binding of the matrix to one enantiomer of an optically active amino acid or peptide. The metal complexes responsible for binding the target compound include a polymerizable moiety which allows the complex to be copolymerized with monomers and crosslinking agents to form molecularly-imprinted porous polymeric materials. The metal complexes must be able to form rapidly reversible mixed-ligand complexes with the target molecule (or its analog). Exemplary functional groups which can be attached to the metal complex to form polymerizable metal complexes include styrene, methacrylate, acrylate, vinyl, vinyl ether, vinyl acetate, trialkoxysilane, dialkylchlorosilane, and epoxy.

The metal-chelating ligand which includes the polymerizable moiety in accordance with the present invention satisfies the following criteria: 1) it should bind tightly to the metal ion; 2) it should allow at least two coordination sites to be or become available for chelation by the target molecule. Further useful features are that the chelating ligand from which the metal complexes are formed contain functional groups that can be chemically modified to 1) introduce the polymerizable functionality for copolymerization; 2) introduce other functional groups suitable for attachment to a solid surface, e.g. silane groups for attachment to silica; or 3) provide additional favorable interactions (e.g. hydrophobic, electrostatic or hydrogen bonding, as the case may be) with the target molecule.

Figure 1:
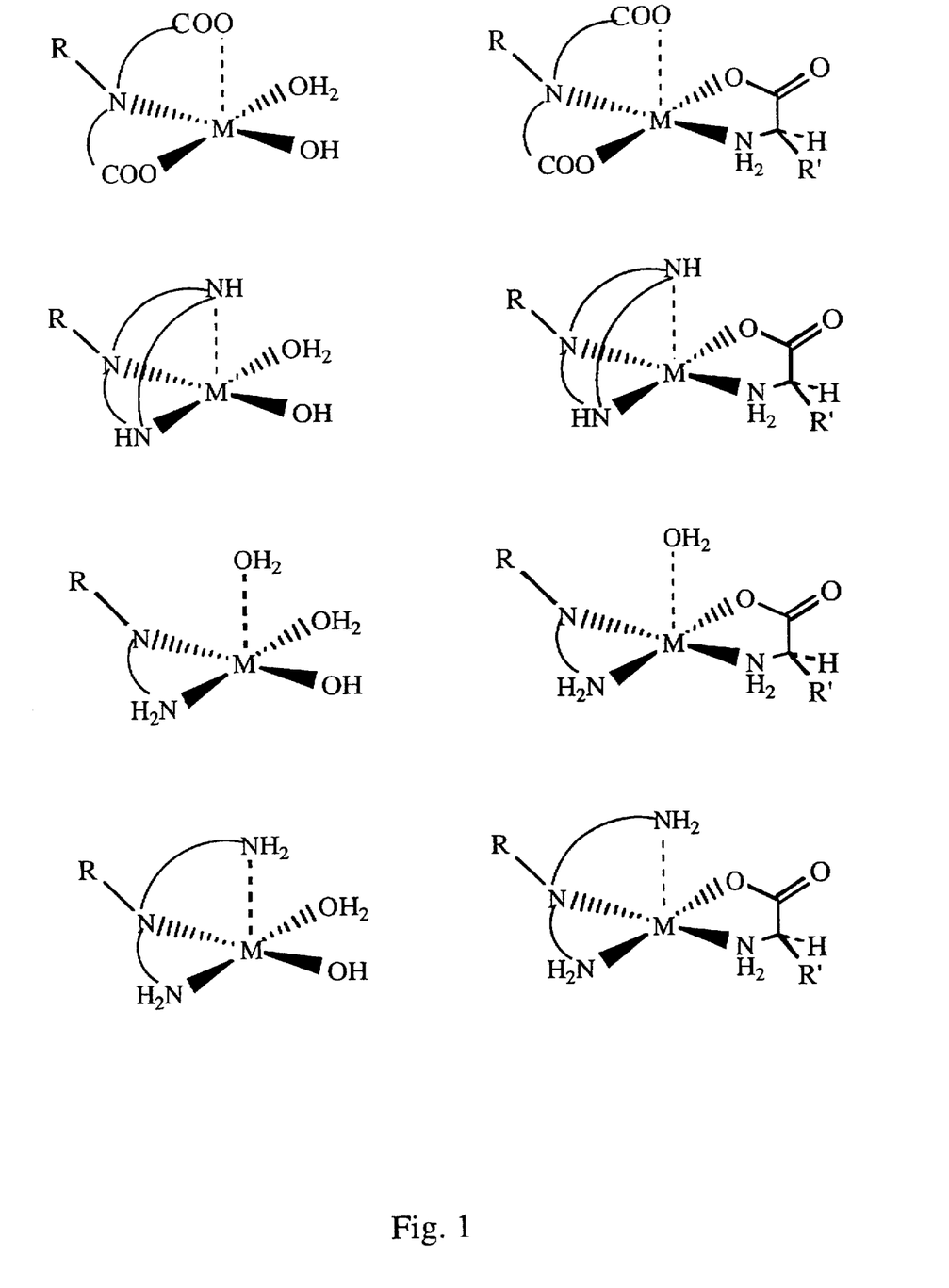
FIG. 1 has diagrammatic representations showing exemplary polymerizable ligands in their form of Cu(II) complexes and as bound to an amino acid.

FIG. 1 shows some exemplary binary and ternary metal complexes for use in synthesizing the materials described in this invention. On the left side, the metal complexes are shown in the binary complex form with the polymerizable metal chelating ligand. On the right side, the corresponding ternary metal-ligand complexes bound to an exemplary target molecule, in this case, an amino acid are shown. The metal complexes are here described only in terms of the ligand moiety used in the complex. It must be remembered that all these ligands are derivatized to include the polymerizable functionality. Exemplary achiral ligands include iminodiacetate (IDA), ethylenediamine (en), triazacyclononane (TACN), diethylenetriamine (dien) and propylenediamine (pn). Examples of chiral polymerizable ligands include amino acids and their derivatives like proline (pro), hydroxyproline (h-pro), allohydroxyproline (ah-pro), valine (val), leucine (leu), isoleucine (ile), tert-leucine (t-leu), histidine (his), tryptophan (trp), phenylglycine, dinitrobenzoylphenylglycine, phenylglycine dinitrobenzoylamide, naphthylglycine dinitrobenzoylamide, valine dinitrophenylurea, valine tert-butylurea, azetidine carboxylic acid, N-benzyl-(R or S)-propanediamine-1,2, dinitrobenzoylphenylglycine, naphthylethylamine, chlorophenylisovaleric acid, napthylglycine dinitrobenzoylamide, naphthylethylamine, phenylethylamine urea, tert-leucine dinitrophenylurea, indoline-2-carboxylic acid, pipecolic acid, porretine, D-penicillamine, ephedrine and tartaric acid.

Preferred metal complexes are those that have one of the following structures:

where M is copper, zinc, cobalt, nickel, mercury, iron, aluminum, silver, barium, $Y^{3+}$ and $La^{3+}$; $S_1$ and $S_2$ are solvent components like $H_2O$, $OH^-$ or other counter anions from the solution, such as $Cl^-$, $PO4^{-3}$, $SO_4^{-2}$ or perchlorate; X is a functional group selected from styrene, methacrylate, acrylate, vinyl ether, vinyl acetate, trialkoxysilane, dialkylchlorosilane, epoxy and alkylhydroxy or alkylamine groups having from 1 to 3 carbon atoms; $L_1$ and $L_2$ are one of N, $COO^-$ or $O^-$; and Y and Z are either H or a functional group selected from styrene, methacrylate, acrylate, vinyl ether, vinyl acetate, trialkoxysilane, dialkylchlorosilane, epoxy and alkylhydroxy or alkylamine groups having from 1 to 3 carbon atoms.

Exemplary monomers and cross-linkers which may be co-polymerized with the polymerizable monomer:template assembly include styrene, methyl methacrylate, 2-hydroxyethyl methacrylate, 2-hydroxyethyl acrylate, methyl acrylate, acrylamide, vinyl ether, vinyl acetate, divinylbenzene, ethylene glycol dimethacrylate, ethylene glycol diacrylate, pentaerythritol dimethacrylate, pentaerythritol diacrylate, N,N'-methylenebisacrylamide, N,N'-ethylenebisacrylamide, N,N'-(1,2-dihydroxyethylene)bisacrylamide, trimethylolpropane trimethacrylate, etc. The choice of co-monomer and crosslinker will be dictated by the chemical (hydrophilicity, local pH, chemical stability, degree of crosslinking, ability to graft to other surfaces, etc.) and physical (porosity, morphology, mechanical stability) properties desired for the polymeric adsorbents. Appropriate co-monomers (e.g. methacrylic acid, various nitrogenous monomers) can also provide additional sites for recognition of the target molecule through hydrogen bonding and electrostatic interactions.

Imprinting polymerization can be conducted in bulk solution of the polymerizable metal complex:template molecule assembly, with appropriate monomers and cross-linker by the free radical method. For bulk polymerization, usually about 5–10 weight percent of the polymerizable metal complex, 95–90 weight percent cross-linker, and 1% of a free radical initiator such as azobis(isobutyronitrile) (AIBN) are dissolved in an aqueous/organic mixed solvent which serves as a porogen to create a porous structure. The solution is heated at 60°–70° C. for 24 hours. The resulting cross-linked polymer is cut into pieces or ground into a powder and washed thoroughly with the same solvent used for the polymerization. Similar methodology can be applied to surface grafting and particle coating with the polymer, as described in Reference No. 9.

The morphology and selectivity of the polymer for binding the target molecule may be improved by altering the solvent, polymerization temperature, choice of crosslinking agent, as described in Reference No. 11, or by using different polymerization mechanisms familiar to those well-versed in the art. In particular, photoinitiation at low temperature should promote high selectivity and strong binding by materials that rely on temperature sensitive interactions for recognition.

Removal of the template molecule leaves a macroporous polymer with complementary molecular cavities which include metal complexes which are positioned for specific binding with the template sugar or its analogs. The resulting imprinted polymer can be prepared in a wide variety of forms ranging from powders to beads to macro structures such as plates, rods, membranes or coatings on other materials. When used as a coating, the polymer matrix may be applied to a wide variety of surfaces including fibers and particles such as beads. Particle sizes ranging from 5 µm to 200 µm may be used with particle sizes of 10 µm to 50 µm being preferred. Coated particles are especially well-suited for use in connection with ligand exchange chromatography and other separation techniques.

Polymerizations can be carried out by sol-gel process as well, if an alkoxysilane type of polymerizable metal complex is used. In this case, the alkoxysilane metal chelating monomer is mixed with tetramethoxysilane or tetraethoxysilane in aqueous solution. The sol-gel condensation can be conducted in acidic or basic conditions using procedures well known to those practiced in the art.

Figure 8:
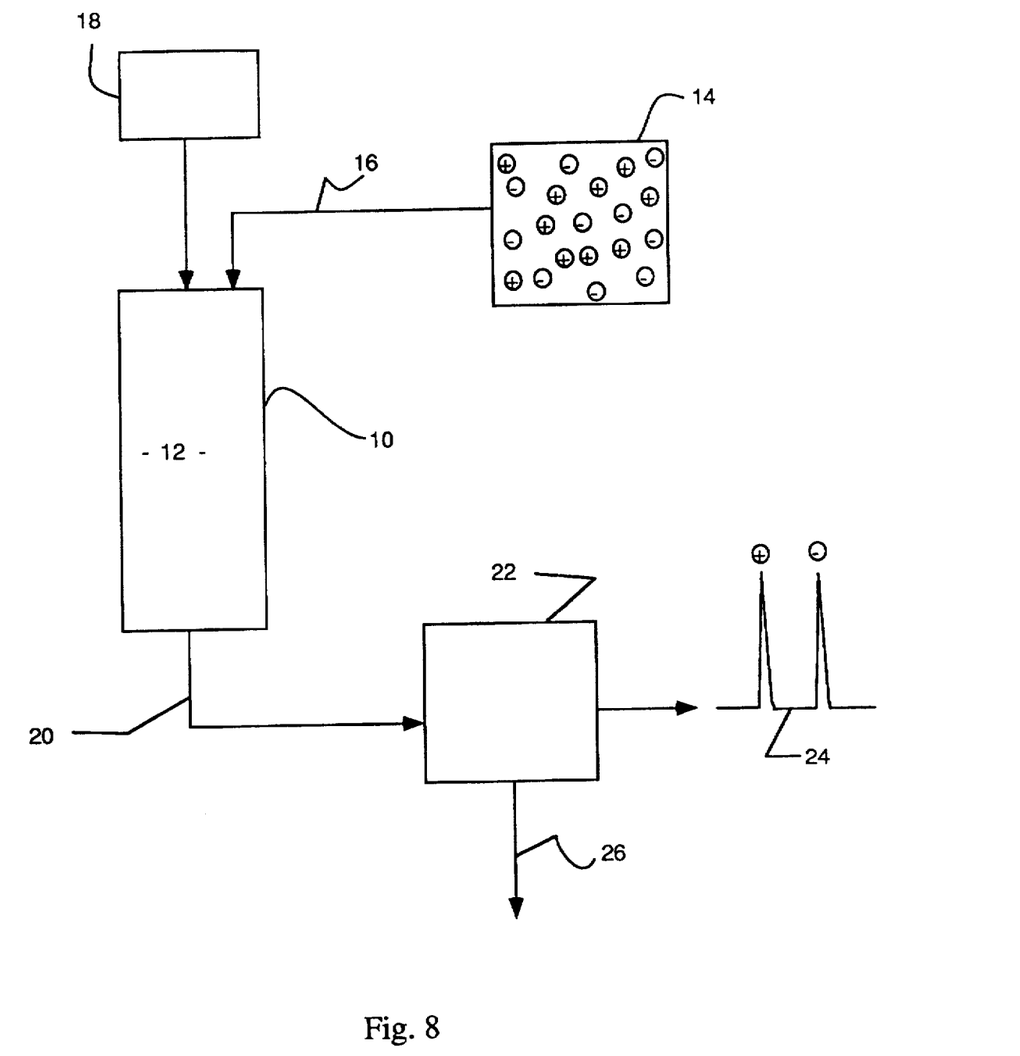
FIG. 8 is a schematic representation of an exemplary separation system in accordance with the present invention.

An exemplary system for conducting enantiomeric resolution of optically active amino acids and peptides in accordance with the present invention is shown schematically in FIG. 8. The system includes a separation vessel 10 which defines a separation zone 12. The separation vessel 10 may be a ligand exchange column or any other apparatus or container which is conventionally used to carry out adsorbent-based separations. For the purposes of this description, the separation vessel 10 is a ligand exchange column where the separation zone 12 is packed with silica particles which have been coated with adsorbent that selectively binds the d optical isomer of an amino acid such as phenylalanine. The composition which is to be enantioresolved is shown at 14. The composition 14 includes a racemic mixture of (d) and (l) enantiomers of the optically active amino acid being separated. In practice, the composition may include other ingredients and may only include one of the enantiomers. In many instances, the ingredients in the composition will be unknown and the present system will be used as a detector to determine if the composition contains the enantiomer of interest, and to determine its relative concentration.

The composition 14 is introduced into the separation zone through line 16 using conventional sample introduction apparatus which is commonly used in connection with ligand exchange/column chromatography. Eluent is passed into the column 10 from reservoir 18. The eluent used in this system can be any of the eluents commonly used in ligand exchange/column chromatography. The particular eluent or eluents which are used will vary widely depending upon the particular amino acid or peptide being separated/identified. In the separation zone 12, the positive enantiomer of phenylalanine preferentially binds with the adsorbent and is eluted more slowly from column 10 through eluent line 20. The eluent is passed through a detector 22 which measures the amount of amino acid in the eluent. The read out from the detector 22 is shown schematically as graph 24 which depicts the separation of the racemic mixture into its optically active components. The eluent is passed from the detector 22 through exit line 26 where the optically active isomers can be recovered in individual aliquots of eluent and further isolated.

It will be recognized by those skilled in the art that the separation system set forth in FIG. 8 is exemplary of any number of separation systems in which adsorbents in accordance with the present invention may be used. For example, in addition to continuous flow column separation systems, the adsorbents may be used in batch type separators or as simulated moving beds.

The present invention is well-suited for separating amino acid and peptide enantiomers. In addition, the adsorbents may be used to separate different amino acids. The same selectivity of the adsorbent which provides for enantiomer selective binding is also useful in providing selectivity of binding between amino acids or peptides. Accordingly, the adsorbent may be used in separation systems and procedures where the goal is to separate a specific amino acid from a group of amino acids or other ingredients in a given composition.

Several examples of practice are laid out in more detail below.

I. Preparation and use of adsorbents for chiral separations of underivatized amino acids

EXAMPLE 1

Synthesis of Ternary Metal Complexes of Polymerizable Ligand and Amino Acid Preparation of the polymerizable template:monomer assembly involves a two-step synthesis: the isolation of Cu(II)[N-(4-vinylbenzyl)imino]diacetate (Cu(VBida)) followed by the addition of amino acid to yield the desired product. The procedure outlined here describes the synthesis of the complexes between Cu(VBida) and phenylalanine. Template:monomer complexes incorporating the amino acids Tyr, Leu, Ile and Val were obtained using similar procedures.

VBida was synthesized as reported previously.[10] However, the Cu(II) complex of VBida was prepared using a modified technique as compared to previously reported procedure. 5.00 g of VBida was dissolved in 150 mL distilled water. The pH was adjusted to 9.5 using 6M NaOH. 5.00 g of $CuSO_4 \cdot 5H_2O$, dissolved in 150 ml distilled water, was added dropwise to the VBida solution, adjusting the pH with 1M NaOH to maintain its value at 9.5. The high dilution is necessary to keep all species in solution as the $CuSO_4$ solution is titrated into the VBida solution, and the high pH helps in keeping the iminodiacetate ligand in a deprotonated form, in order to chelate the Cu(II) ion quickly as it is titrated in. In order to avoid irreversible precipitation of Cu(II) as a hydroxide species, the addition of the $CuSO_4$ solution must be done carefully. That the Cu(II) is being chelated by VBida can be seen by the change in the color of the solution to a dark blue, and the reaction can also be followed by uv/vis spectroscopy ($\lambda$=700 nm).

The resulting dark blue solution was vacuum filtered and diluted to 500 mL with distilled water. The solution is frozen at $-70°$ C. and lyophilized. The lyophilized powder was dissolved in 100 mL of 100% methanol and stirred for 1 hour. The methanol solution was vacuum filtered and the solvent removed by rotary evaporation. The solid obtained was then redissolved in 50 mL 100% methanol and stirred for 1 hour. The solution was filtered and the solvent was removed by rotary evaporation after which the desired complex is obtained as a dark blue solid. Yield=62%.

Formation of the Cu(VBida)(phe) MLA complex was achieved using 2 g of purified Cu(VBida) dissolved in 100 mL of distilled water. 0.7 g of Phe is dissolved in 30 mL of distilled water and added dropwise to the CuStyIDA solution and maintaining the pH between 8–8.5 using 1M NaOH. The solution was left stirring for 1 hour and subsequently cooled to $-70°$ C. and freeze-dried via the lyophilizer. Yield=84%. MLA complexes using racemic phe, d-phe and l-phe were prepared by the above method, to obtain Cu(VBida)(rac-phe), Cu(VBida)(d-phe) and Cu(VBida)(l-phe), respectively.

EXAMPLE 2

Preparation Of Ligand Exchange Adsorbent By Coating Particles With Molecularly-Imprinted Polymer And Their Use In Equilibrium Rebinding And Chromatographic Separation A typical procedure for preparing molecularly-imprinted polymer based materials using Cu(Vbida)(d-phe) is outlined below. The imprinted polymers are synthesized as a surface coat on silica particles or on the surface of poly(TRIM) particles. Identical procedures are used for synthesis of materials with l-amino acid and (racemic) rac-amino acid as templates. The material synthesized using rac-amino acid template serves as a control in the rebinding examples. A control material was also synthesized in which the Cu(VBida) was used as the monomer without adding any amino acid template.

I. Derivatization of silica particles

Silica (LiChrosphere 1000, 10 μm particles, 1000 Å pores) was washed with distilled $H_2O$ and boiled in 5% $HNO_3$. The particles were filtered on a fine-fritted filter, washed extensively with $dH_2O$, and dried at 150° C. for 24 hours. A 1 mm vacuum was applied to the oven-dried silica in a three-neck flask for 30 minutes, after which the vessel is sealed. Toluene, dried over sodium and distilled, was added to the silica under vacuum. 3-(trimethoxysilyl)propyl methacrylate (50% w/w silica) and a trace of triethylamine were added to complete the reaction mixture. This mixture was refluxed for 15 hours under nitrogen. The silica was isolated by filtration over a fine-fritted filter and freed of any residue by successive washing with toluene, acetone, and ether. The derivatized silica was then dried under vacuum for 24 hours.

II. Polymer Coating Processes 4 g of ground, sieved poly(TRIM) particles (prepared as described in Reference 9) or propylmethacrylate-derivatized silica (prepared as described above) was placed in a 50 mL three-necked round-bottom flask and a 1 mm vacuum applied. 80% aqueous methanol was added under vacuum to cover the surface (about 10 mL). 0.76 g ethylene glycol dimethacrylate (EGDMA) and 0.5 g Cu(VBida)(d-Phe) were then added to the silica particles under vacuum. After mixing for 1 hour, this mixture was sonicated for 20 min to allow penetration of solvent into the pore space. 10 mg of initiator (4,4'-Azobis(4-cyanovaleric acid)—ACVA) was then dissolved in 5mL of methanol and added under vacuum, after which the vessel was sealed. The reaction mixture was then placed in a constant temperature shaker at 40° C. bath for 48 hours with gentle agitation. The coated silica was then suspended in methanol and centrifuged thrice.

III. Cu (II) Removal and Reloading

Removal of Cu(II) is effected by equilibrating the polymer-coated silica with 1M ethylene diamine tetraacetic acid (EDTA) at pH 7 for 48 hours. The amount of Cu(II) removed was studied by uv/vis spectroscopy. Analysis indicated a Cu removal of 95% based on the amount of Cu incorporated into the polymer-coated silica.

The silica was subsequently washed three times with 50 mL portions of distilled water in order to remove residual EDTA. Then enough water was added to immerse the silica particles and a few drops of 1M NaOH were added until the pH stabilized to reach a final value of 8. To reload the imprinted material with Cu(II), 20 mL of a 0.5M solution of $CuSO_4$ was added to the silica. After equilibration overnight, the silica was washed thrice with 50 mL portions of distilled water (until solution was no longer blue), saving the supernates. The amount of Cu(II) in the supernate is determined as $[Cu(EDTA)]^{-2}$ by uv/vis spectroscopy and reloading capacity calculated. Reloading is nearly quantitative with 98% of Cu(II) reloaded, based on the amount of Cu(II) removed earlier from the material.

IV. Polarimetric Analysis—Equilibrium Rebinding

The imprinted materials showed negligible binding to their substrates when used in the metal-ion free state. Competitive rebinding experiments were therefore carried out with the material reloaded with Cu(II). For every amino acid, all four types of materials synthesized—the two control materials and the two materials imprinted with the d- and l-amino acid—were investigated for their equilibrium rebinding properties. In a typical experiment, 50 mg of d,l-phe was dissolved in 10 mL of distilled water. The phenylalanine solution was equilibrated to a pH of 8 with a few drops of 1M NaOH and added to 1 g of the polymer-coated silica to equilibrate for 24 hours, following which the supernatant was decanted out after centrifugation. The silica was then washed thoroughly with 25 mL of distilled water, followed by another centrifugation and the supernate was decanted out. The total phenylalanine concentration in the supernatant solution was estimated using uv/vis spectroscopy. The combined supernate was then freeze-dried to a smaller volume of 10 mL for polarimetry analysis. The observed optical purity of the supernatant, combined with a mass balance, was used for calculating the equilibrium rebinding selectivity of the imprinted polymer-coated silicas.

V. Chromatography

The Cu-free material was packed into a chromatography column (4.6 mm id×50 mm) following previously published procedures.[12] Zn(II) was loaded using 20 mM $ZnCl_2$, while Cu(II) was reloaded onto the column by washing with 20 mM $CuSO_4$ solution, followed by washing with water till a steady baseline was reached. 100 mL of a 1 mM solution of rac-Phe was used as the sample loading in a typical experiment. Chromatographic separations were achieved at a temperature of 50° C., using isocratic elution with 1 mM glycine in the eluent.

Results

Figure 2:
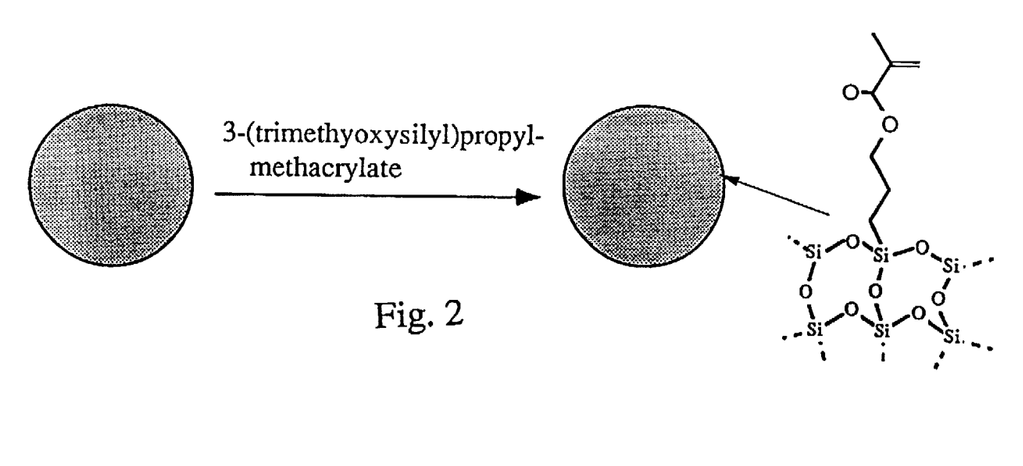
FIG. 2 is a diagrammatic representation of an exemplary procedure for introducing double bonds on the surface of silica particles by a silanization reaction with 3-(trimethoxysilyl) propylmethacrylate.
Figure 3:
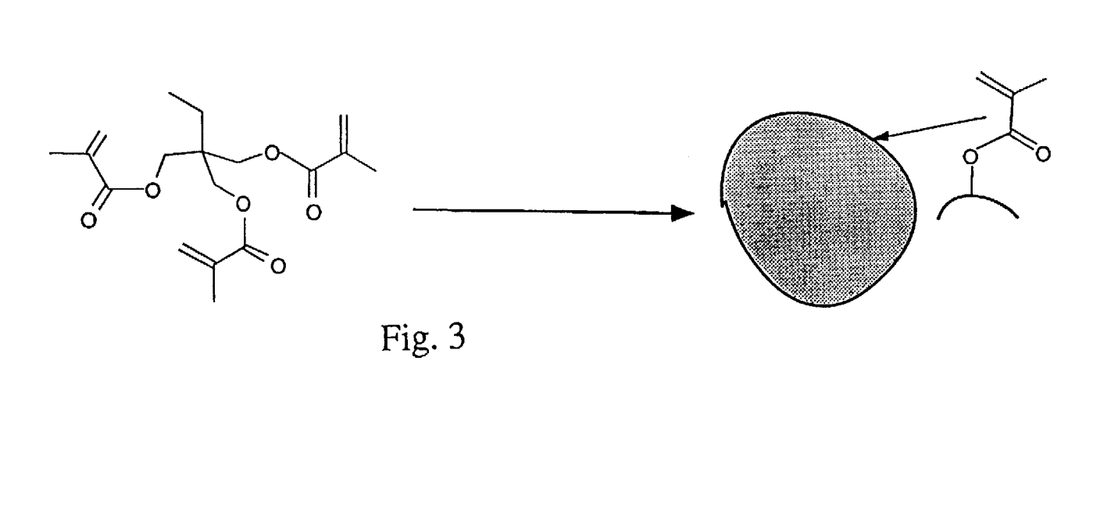
FIG. 3 is a diagrammatic representation of an exemplary synthesis scheme for preparation of polymer particles with residual double bonds using a multi-functional monomer like trimethylolpropane trimethacrylate.
Figure 4:
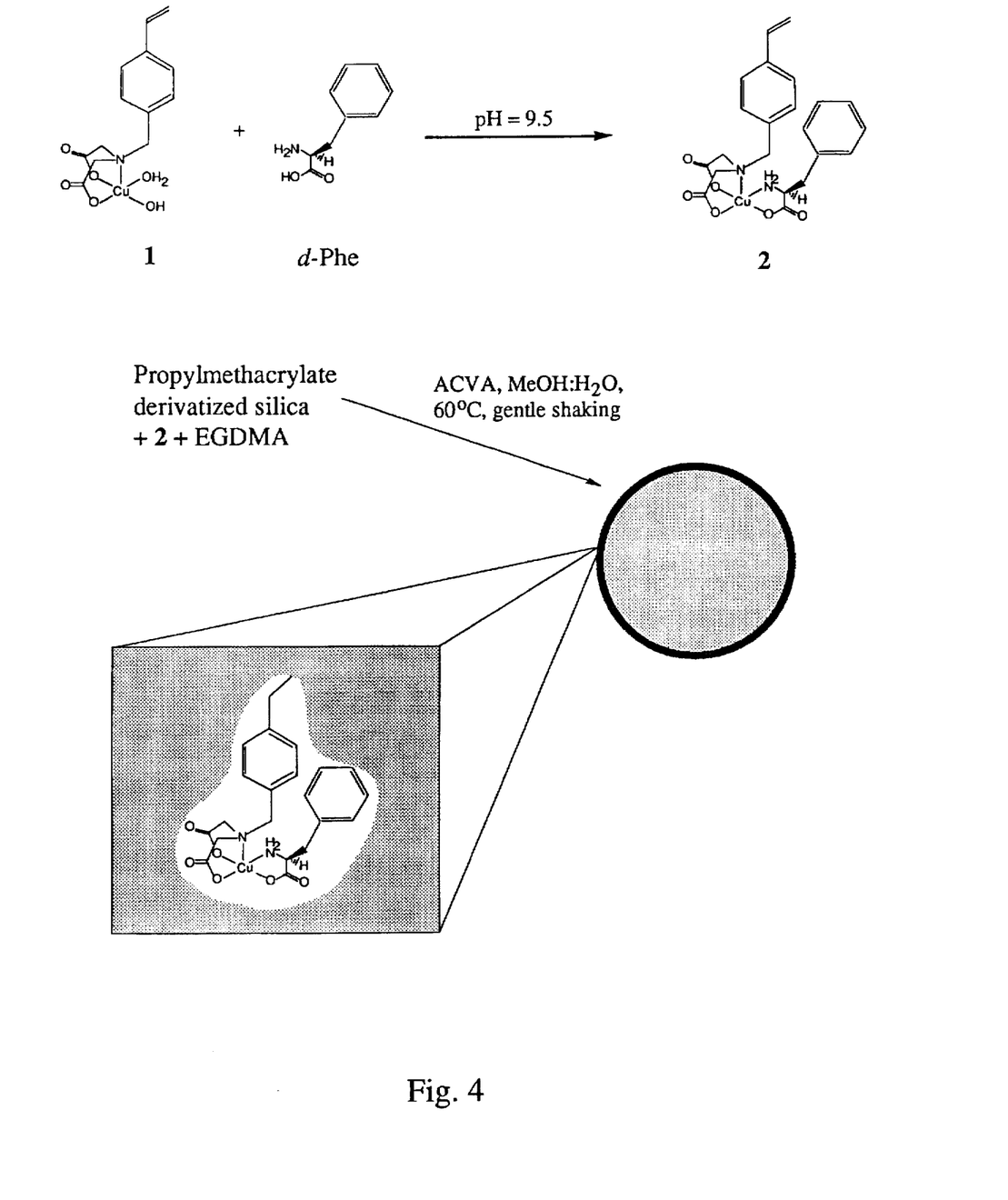
FIG. 4 is a diagrammatic representation of an exemplary synthesis of a preferred amino acid binding polymer material, wherein the polymer is a macroporous solid formed by copolymerization of the functional monomer-metal-amino acid ternary complex with cross-linking agent, and obtained as a surface coat on propylmethacrylate derivatized silica particles.

In order to test the efficacy of molecular imprinting for enantioresolution of α-amino acids, we synthesized imprinted polymer-coated silica based LEC supports using a variety of amino acids as templates. The preparation of the adsorbent is shown schematically in FIG. 2 and FIG. 4, using phenylalanine as an example. Spherical silica particles are derivatized with 3-(trimethoxysilyl)propyl methacrylate to introduce double bonds on the surface. These double bonds can be used to anchor the imprinted material by means of graft copolymerization. The imprinted adsorbent material in each case was synthesized using one amino acid enantiomer as the template. These materials were compared with two types of control materials. The first control was a material synthesized without any template. The second control material was synthesized using a racemic mixture of the amino acid as the template. Thus, for phenylalanine, four kinds of materials were compared—a material imprinted with d-phenylalanine, a material imprinted with l-phenylalanine, a material imprinted with rac-phenylalanine and a non-imprinted control. The rationale behind the two controls was that the first material should show no enantioselectivity because of a lack of chirality in the binding cavities, whereas in the second material, half the binding cavities would be of one chirality and the other half would be of the opposite chirality. This second material should also show no ability to discriminate among the enantiomers.

Competitive equilibrium rebinding studies were carried out with the imprinted materials, using the racemic mixture of the amino acid to study enantioresolution. The Cu-free material showed negligible rebinding of the amino acid, indicating that the metal ion is necessary for amino acid adsorption. The imprinted supports were reloaded with Cu(II) and equilibrated with an aqueous solution of the racemic amino acid for 24 hours. Polarimetry was used to determine the optical activity of the supernatant solution and an enantiomeric excess calculated by combining this measurement with uv-absorption to measure the total amino acid concentration in the supernatant. Table I shows the results of competitive rebinding experiments for all amino acids studied. In each case, both control materials showed no preference for either enantiomer in competitive rebinding studies. The imprinted materials, in contrast, are selective for that enantiomer which was used as the template in the material synthesis procedure. As also can be seen from Table I, the materials templated with phenylalanine also showed enantioselectivity when challenged with d,l-tyrosine. Similarly, the materials imprinted with leucine exhibited enantioselectivity on rebinding of d,l-isoleucine. The materials imprinted with valine isomers did not exhibit any enantioselectivity for amino acids other than valine.

TABLE I

Selectivity shown in equilibrium rebinding studies: The polymer code consists of P, followed by the letter denoting the chirality of the amino acid template, followed by the one letter amino acid code. Thus, P-d-F denotes a polymer imprinted with d-phenylalanine. L = leucine, I = isoleucine, Y = tyrosine.

| Polymer Code | Substrates | Selectivity $\alpha_{l/d}$ |
|---|---|---|
| Control Materials | | |
| P-dl-F | dl-F | 1.0 |
| P-dl-F | dl-Y | 1.0 |
| P-dl-Y | dl-F | 1.0 |
| P-dl-Y | dl-Y | 1.0 |
| P-dl-I | dl-I | 1.0 |
| P-dl-I | dl-L | 1.0 |
| P-dl-L | dl-I | 1.0 |
| P-dl-L | dl-L | 1.0 |
| P-dl-V | dl-V | 1.0 |
| Materials Imprinted with d-amino acids | | |
| P-d-F | dl-F | 0.68 |
| P-d-F | dl-Y | 0.72 |
| P-d-Y | dl-Y | 0.70 |
| P-d-Y | dl-F | 0.73 |
| P-d-I | dl-I | 0.80 |
| P-d-I | dl-L | 0.86 |
| P-d-L | dl-L | 0.87 |
| P-d-L | dl-I | 0.89 |
| P-d-V | dl-V | 0.92 |
| Materials Imprinted with l-amino acids | | |
| P-l-F | dl-F | 1.45 |
| P-l-F | dl-Y | 1.38 |
| P-l-Y | dl-Y | 1.42 |
| P-l-Y | dl-F | 1.36 |
| P-l-I | dl-I | 1.23 |
| P-l-I | dl-L | 1.18 |
| P-l-L | dl-L | 1.19 |
| P-l-L | dl-I | 1.14 |
| P-l-V | dl-V | 1.08 |

Figure 5:
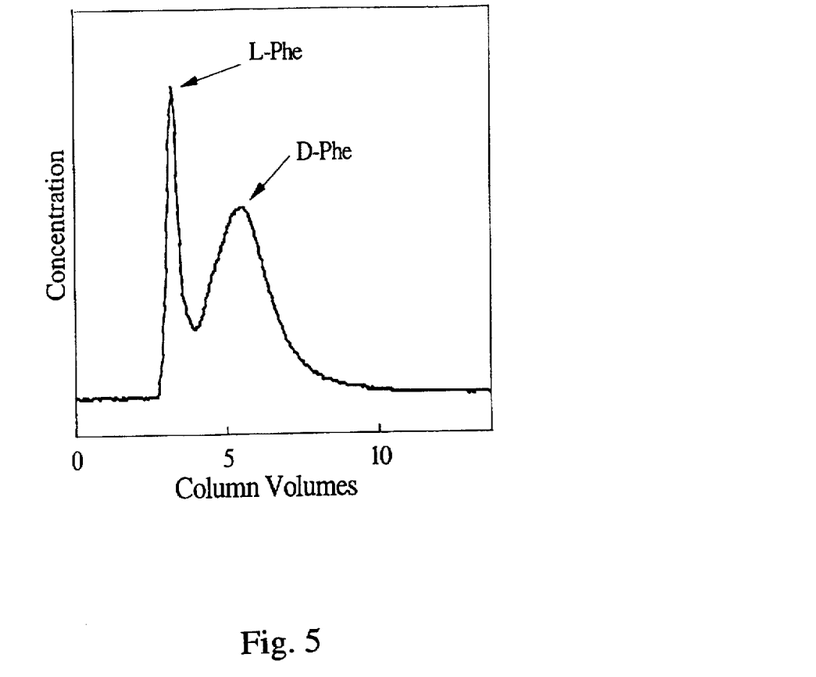
FIG. 5 is an exemplary chromatogram showing the separation of dl-phenylalanine in an HPLC setup, using the d-phenylalanine imprinted material as the chromatographic adsorbent. In accordance with the present invention, the racemic mixture can be resolved into its enantiomers using the imprinted material as a chromatographic support.

The enantioresolution of racemic amino acid mixtures was also studied by the chromatographic mode. The imprinted polymer-coated silica particles were slurry-packed into an HPLC column. The material was packed in the metal-ion free form, and Cu(II) ions were reloaded onto the material under flow conditions. The Cu(II)loaded materials were able to separate l- and d-isomers with the imprint enantiomer being more strongly retained than the other isomer. Enantioresolution was achieved at 50° C. by isocratic elution with 1 mM glycine in the eluent as a competitor. FIG. 5 shows a sample chromatographic separation of d,l-phe on the material imprinted with d-phenylalanine. The peak identification was confirmed by comparison with the retentions of the pure isomers on the column. The chromatograms of the other amino acids are similar, with a broad elution peak for the strongly retained enantiomer and a narrower peak for the less retained isomer.

Figure 6:
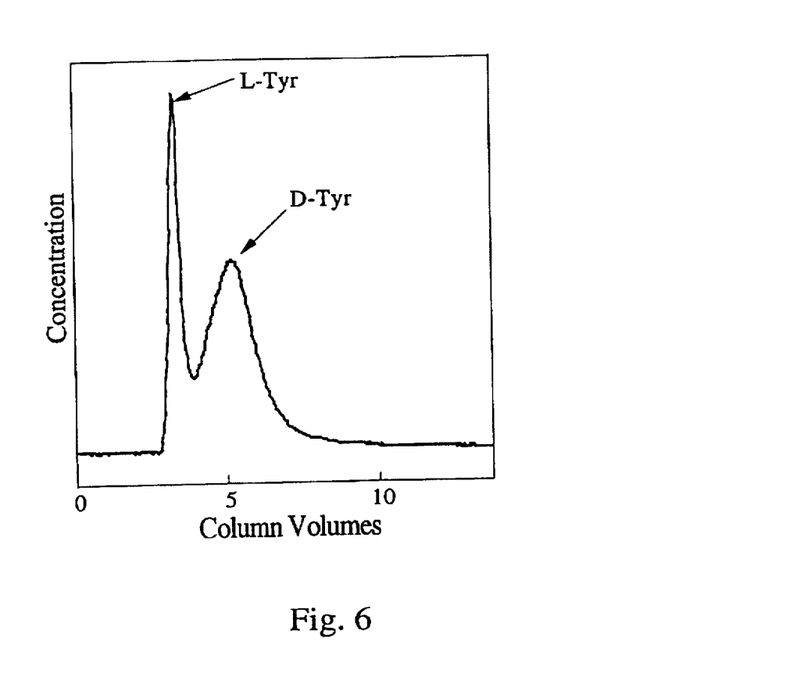
FIG. 6 is an exemplary separation of dl-tyrosine in an HPLC setup, using the d-phenylalanine imprinted material as the chromatographic adsorbent. This shows another exemplary feature of the present invention, whereby a material imprinted for the d-form of one substrate also exhibits enantioselectivity for the d-form of a closely related substrate.

The Phe-imprinted materials were unable to resolve racemic mixtures of Ala, Val, Leu or Ile into their isomers, in the chromatographic mode. These amino acids were retained less strongly than phe or tyr, and there was no enantioselectivity. On the other hand, d,l-tyr was resolved into its enantiomers similarly to d,l-phe (FIGS. 5 & 6). Thus, a material imprinted with one chiral template can be used to resolve another closely related molecule. The aromatic amino acid tryptophan was strongly retained but not resolved efficiently into its enantiomers on the same column. Similarly, the Leu-imprinted materials resolved Leu and Ile into their enantiomers, but retained Val, Phe and Tyr less strongly and did not resolve them into their enantiomers.

Figure 7:
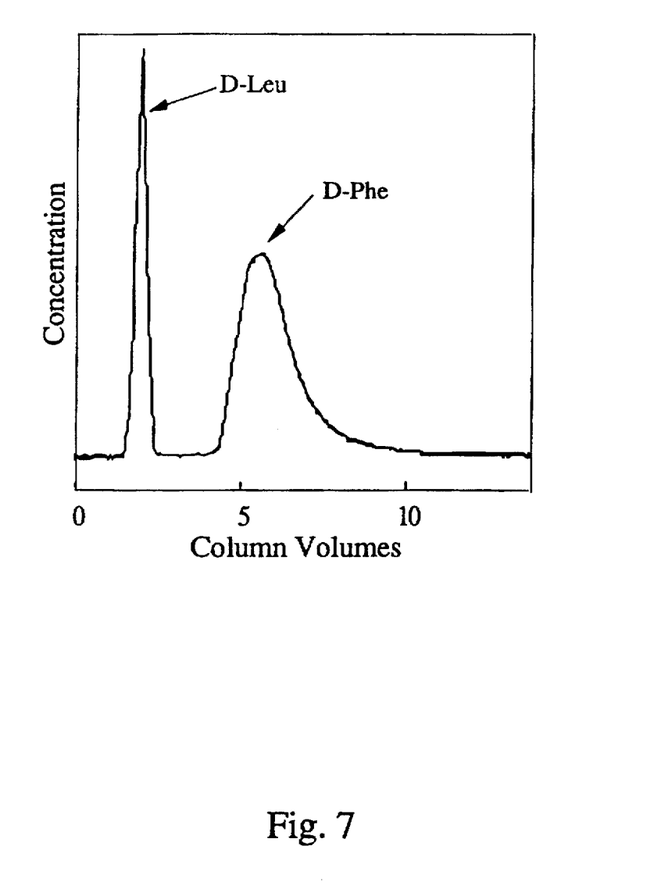
FIG. 7 shows an exemplary separation of d-phenylalanine from a mixture containing d-leucine on an adsorbent imprinted with d-phenylalanine. The imprinted materials can thus be used to separate the enantiomer of the targeted amino acid from other amino acids also.

The imprinted material can also be used to separate the targeted amino acid from other amino acids. FIG. 7 shows the separation of a mixture of d-Leu and d-Phe on an adsorbent imprinted with d-Phe. The Phe isomer is retained strongly, thus separating it from the other amino acid. The imprinted adsorbents can therefore be used for separating one amino acid from another, with well-defined selectivity characteristics.

As can be seen from the preceding examples, the present invention provides a number of desirable features which are particularly useful for separating amino acids. These features include: 1) The adsorbents are prepared using the underivatized amino acid as the template molecule and are capable of separating the underivatized amino acids in aqueous solution; 2) The materials can be made selective for the enantiomeric separation of groups of related amino acids as evidenced by the fact that the adsorbent prepared with l-phenylalanine as the template is also capable of enantioresolution of d,l-tyrosine; and 3) The method offers the ability to tailor-make adsorbents with predictable selectivities for specific separations.

Having thus described exemplary embodiments of the present invention, it should be noted by those skilled in the art that the disclosures herein are exemplary only and that various other alternations, adaptations and modifications may be made within the scope of the present invention. Accordingly, the present invention is not limited to the specific embodiments as illustrated herein.

BIBLIOGRAPHY

1. Davankov, V. A.; Rogozhin, S. V. *J. Chem. Soc.* 1971, 490.
2. Lefebvre, B.; Audebert, R.; Quivoron, C. *J. Liq. Chromatogr.* 1, 1978, 761–770.
3. Davankov, V. A. In *Complexation Chromatography*, Caignant, D. (ed.), 1992, Chromatographic Science Series, Vol. 57, Marcel Dekker, NY, pp. 197–245.
4. Galaverna, G.; Carradini, R.; Munari, E.; Dossena, A.; Marchelli, R. J. *Chromatogr. A* 657, 1993, 43—54.
5. Sellergren, B.; Lepisto, M.; Mosbach, K. *J. Am. Chem. Soc.* 110, 17, 1988, 5853–5860.
6. Sellergren, B.; Ekberg, G.; Mosbach. K. *J. Chromatogr.* 347, 1, 1985, 1–10.
7. Andersson, L.; Sellergren, B.; Mosbach, K. *Tetrahedron Lett.* 25, 45, 1984, 5211–5214.
8. Kempe, M.; Mosbach, K. *Anal. Lett.* 24, 7, 1991, 1137–1145.
9. Dhal, P. K.; Vidyasankar, S.; Arnold, F. H. *Chemistry of Materials* 7, 1995, 154–162.
10. Dhal, P. K.; Arnold, F. H. *Macromolecules* 25, 1992, 7051–7059.
11. Sellergren, B.; Shea, K. J. *J. Chromatogr A* 635, 1993, 31–49.
12. Plunkett, S. D.; Arnold, F. H. *J. Chromatogr. A* 708, 1995, 19–29.

What is claimed is:

1. An adsorbent which selectively binds to a target molecule which is an enantiomer of an optically active amino acid or peptide, said adsorbent comprising:
   an imprinted polymer matrix comprising a porous polymer and a plurality of metal complexes, each of said metal complexes comprising a polymerizable moiety and a ligand moiety, said metal complexes being linked to said porous polymer via said polymerizable moiety during imprinting polymerization in the presence of said target molecule or analog thereof, wherein said imprinted polymer matrix selectively binds to said target molecule; and
   a support structure having a surface, said imprinted polymer matrix being attached to said support structure as a coating thereon.

2. An adsorbent according to claim 1 wherein said ligand moieties provide selective binding to a target molecule which is an enantiomer of an optically active amino acid.

3. An adsorbent according to claim 1 wherein said ligand moieties provide selective binding to a target molecule which is an enantiomer of an optically active peptide.

4. An adsorbent according to claim 1 wherein said support structure is a particle.

5. An adsorbent according to claim 1 wherein said support structure comprises a polymer.

6. An adsorbent according to claim 5 wherein said support structure is a particle.

7. An adsorbent according to claim 4 wherein said particle has a size within the range of 5 microns to 200 microns.

8. An adsorbent according to claim 1 wherein said ligand moiety comprises a metal ion selected from the group of metals consisting of copper, zinc, cobalt, nickel, mercury, iron, aluminum, silver, barium, $Y^{3+}$ and $La^{3+}$.

9. An adsorbent according to claim 8 wherein said metal complex comprises a complex selected from the group consisting of iminodiacetate, ethylenediamine, triazacyclononane, diethylenetriamine, propylenediamine, proline, hydroxyproline, allohydroxyproline, valine, leucine, isoleucine, tert-leucine, histidine, tryptophan, phenylglycine, dinitrobenzoylphenylglycine, phenylglycine dinitrobenzoylamide, naphythylglycine dinitrobenzoylamide, valine dinitrophenylurea, valine tert-butylurea, N-benzyl-(R or S)-propanediamine-1,2, dinitrobenzoylphenylglycine, naphthylethylamine, chlorophenylisovaleric acid, napthylglycine dinitrobenzoylamide, naphthylethylamine, phenylethylamine urea, tert-leucine dinitrophenylurea, indoline-2-carboxylic acid, pipecolic acid, porretine, D-penicillamine, ephedrine and tartaric acid.

10. An adsorbent according to claim 1 wherein said polymerizable moiety is selected from the group consisting of styrene, methacrylate, acrylate, vinyl, vinyl ether, vinyl acetate, trialkoxysilane, dialkylcholorosilane and epoxy.

11. An adsorbent according to claim 1 wherein said polymer matrix is formed by copolymerization of said metal complex containing said polymerizable moiety with a monomer and crosslinking agent.

12. An adsorbent according to claim 11 wherein said monomer and crosslinking agent are selected from the group consisting of styrene, methyl methacrylate, 2-hydroxyethyl methacrylate, 2-hydroxyethyl acrylate, methyl acrylate, acrylamide, vinyl ether, vinyl acetate, divinylbenzene, ethylene glycol dimethacrylate, ethylene glycol diacrylate, pentaerythritol dimethacrylate, pentaerythritol diacrylate, N,N'- methylenebisacrylamide, N,N'-ethylenebisacrylamide, N,N'-(1,2-dihydroxyethylene)bis-acrylamide and trimethylolpropane trimethacrylate.

13. An adsorbent which selectively binds to a target molecule which is an enantiomer of an optically active amino acid or peptide, said adsorbent comprising:

an imprinted polymer matrix comprising a porous polymer and a plurality of metal complexes, each of said metal complexes comprising a polymerizable moiety and a ligand moiety, said metal complexes being linked to said porous polymer via said polymerizable moiety during imprinting polymerization in the presence of said target molecule or analog thereof, said metal complexes having one of the following structures:

where M is copper, zinc, cobalt, vanadium, mercury, iron, aluminum, silver, barium, borate, calcium, $Y^{3+}$ and $La^{3+}$; $S_1$ and $S_2$ are solvent components selected from the group consisting of $H_2O$, $OH^-$ and other counter anions from said solution, such as $Cl^-$, $PO4^{-3}$, $SO_4^{-2}$ or perchlorate; X is a functional group selected from the group consisting of styrene, methacrylate, acrylate, vinyl ether, vinyl acetate, trialkoxysilane, dialkylchlorosilane, epoxy and alkylhydroxy or alkylamine groups having from 1 to 3 carbon atoms; $L_1$ and $L_2$ are selected from the group consisting of N, $COO^-$ or $O^-$; and Y and Z is either H or a functional group selected from the group consisting of styrene, methacrylate, acrylate, vinyl ether, vinyl acetate, trialkoxysilane, dialkylchlorosilane, epoxy and alkylhydroxy and alkylamine groups having from 1 to 3 carbon atoms, said metal complexes being linked to said porous polymer via X and Y and/or Z to provide selective binding of said ligand moieties with said target molecule.

14. An adsorbent according to claim 13 wherein said adsorbent comprises a support structure having a surface, said imprinted polymer matrix being attached to said support structure surface as a coating thereon.

15. An adsorbent according to claim 13 wherein said ligand moieties provide selective binding to a target molecule which is an enantiomer of an optically active amino acid.

16. An adsorbent according to claim 13 wherein said ligand moieties provide selective binding to a target molecule which is an enantiomer of an optically active peptide.

17. An adsorbent according to claim 14 wherein said support structure is a particle.

18. An adsorbent according to claim 14 wherein said support structure comprises a polymer.

19. An adsorbent according to claim 18 wherein said support structure is a particle.

20. An adsorbent according to claim 17 wherein said particle has a size within the range of 5 microns to 200 microns.

21. An adsorbent according to claim 14 wherein said metal complex comprises a complex selected from the group consisting of iminodiacetate, ethylenediamine, triazacyclononane, diethylenetriamine, propylenediamine, proline, hydroxyproline, allohydroxyproline, valine, leucine, isoleucine, tert-leucine, histidine, tryptophan, phenylglycine, dinitrobenzoylphenylglycine, phenylglycine dinitrobenzoylamide, naphythylglycine dinitrobenzoylamide, valine dinitrophenylurea, valine tert-butylurea, N-benzyl-(R or S)-propanediamine-1,2, dinitrobenzoylphenylglycine, naphthylethylamine, chlorophenylisovaleric acid, napthylglycine dinitrobenzoylamide, naphthylethylamine, phenylethylamine urea, tert-leucine dinitrophenylurea, indoline-2-carboxylic acid, pipecolic acid, porretine, D-penicillamine, ephedrine and tartaric acid.

22. An adsorbent according to claim 13 wherein said polymer matrix is formed by copolymerization of said metal complex containing said polymerizable moiety with a monomer and crosslinking agent.

23. An adsorbent according to claim 22 wherein said monomer and crosslinking agent are selected from the group consisting of styrene, methyl methacrylate, 2-hydroxyethyl methacrylate, 2-hydroxyethyl acrylate, methyl acrylate, acrylamide, vinyl ether, vinyl acetate, divinylbenzene, ethylene glycol dimethacrylate, ethylene glycol diacrylate, pentaerythritol dimethacrylate, pentaerythritol diacrylate, N,N'-methylenebisacrylamide, N,N'-ethylenebisacrylamide, N,N'-(1,2-dihydroxyethylene)bis-acrylamide and trimethylolpropane trimethacrylate.

* * * * *